(12) United States Patent
Waldo

(10) Patent No.: US 7,628,176 B2
(45) Date of Patent: Dec. 8, 2009

(54) PIPELINE STOP

(76) Inventor: Louis C. Waldo, 105 Cherry Hills Dr., Rockport, TX (US) 78382

( * ) Notice: Subject to any disclaimer, the term of this patent is extended or adjusted under 35 U.S.C. 154(b) by 372 days.

(21) Appl. No.: 11/604,524

(22) Filed: Nov. 27, 2006

(65) Prior Publication Data

US 2008/0121302 A1  May 29, 2008

(51) Int. Cl.
*F16L 55/11* (2006.01)

(52) U.S. Cl. .............. 138/91; 138/89; 138/94

(58) Field of Classification Search .......... 138/89, 138/91, 94
See application file for complete search history.

(56) References Cited

U.S. PATENT DOCUMENTS

| | | | | |
|---|---|---|---|---|
| 600,181 | A | * | 3/1898 | Smith .................. 251/167 |
| 1,134,811 | A | * | 4/1915 | Berger ................. 251/187 |
| 1,769,386 | A | * | 7/1930 | Orton .................. 251/326 |
| 2,285,392 | A | * | 6/1942 | Cline ................... 138/94 |
| 3,170,226 | A | * | 2/1965 | Larry ................. 29/890.11 |
| 4,314,579 | A | * | 2/1982 | Wheatley et al. ........ 137/312 |
| 4,682,631 | A | * | 7/1987 | Wilger et al. ........... 138/94 |
| 7,270,139 | B2 | * | 9/2007 | Calkins et al. ........ 137/15.12 |
| 7,281,543 | B2 | * | 10/2007 | Calkins et al. ........ 137/15.12 |

\* cited by examiner

*Primary Examiner*—James F Hook
(74) *Attorney, Agent, or Firm*—G. Turner Moller

(57) ABSTRACT

A pipeline stop is used to temporarily plug a pipeline to allow repairs to the pipeline. The pipeline stop includes lateral sections expanded into a sealing position blocking flow through the pipeline. A central section is moved downwardly to expand the lateral sections. Inclined links transfer force from the central section to the lateral sections. As the central section moves downwardly, the links move from a first inclined position to a second, more nearly horizontal, position. Upward movement of the central section allows the lateral sections to retract, typically by use of springs.

22 Claims, 6 Drawing Sheets

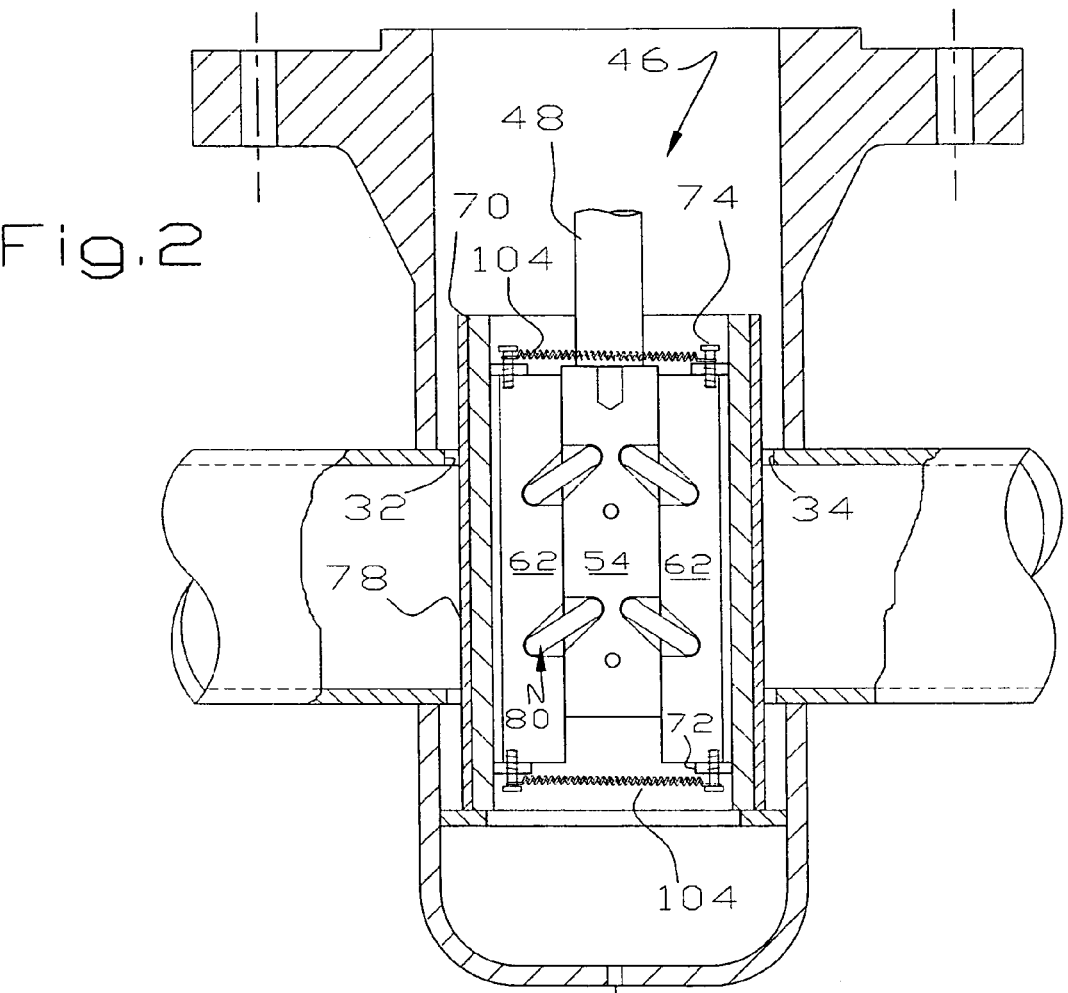
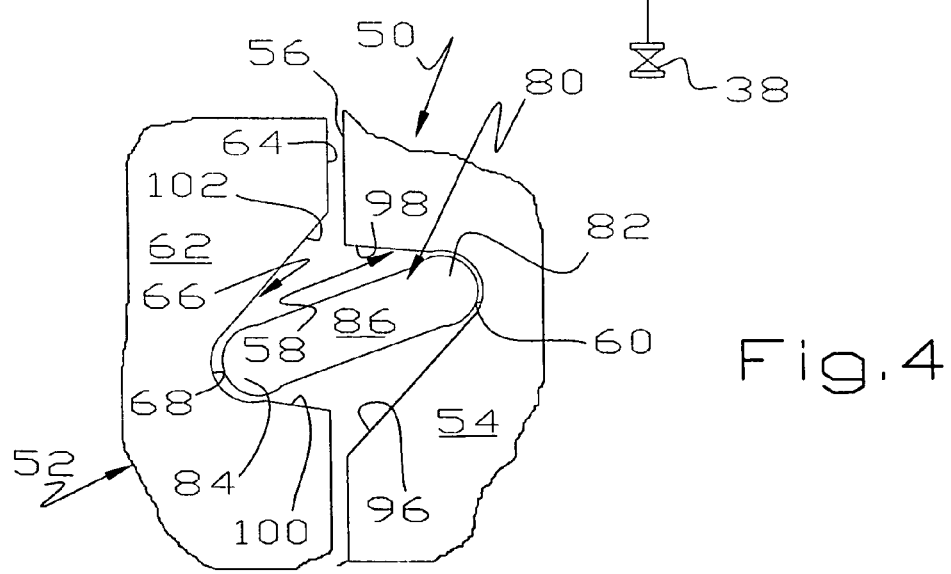

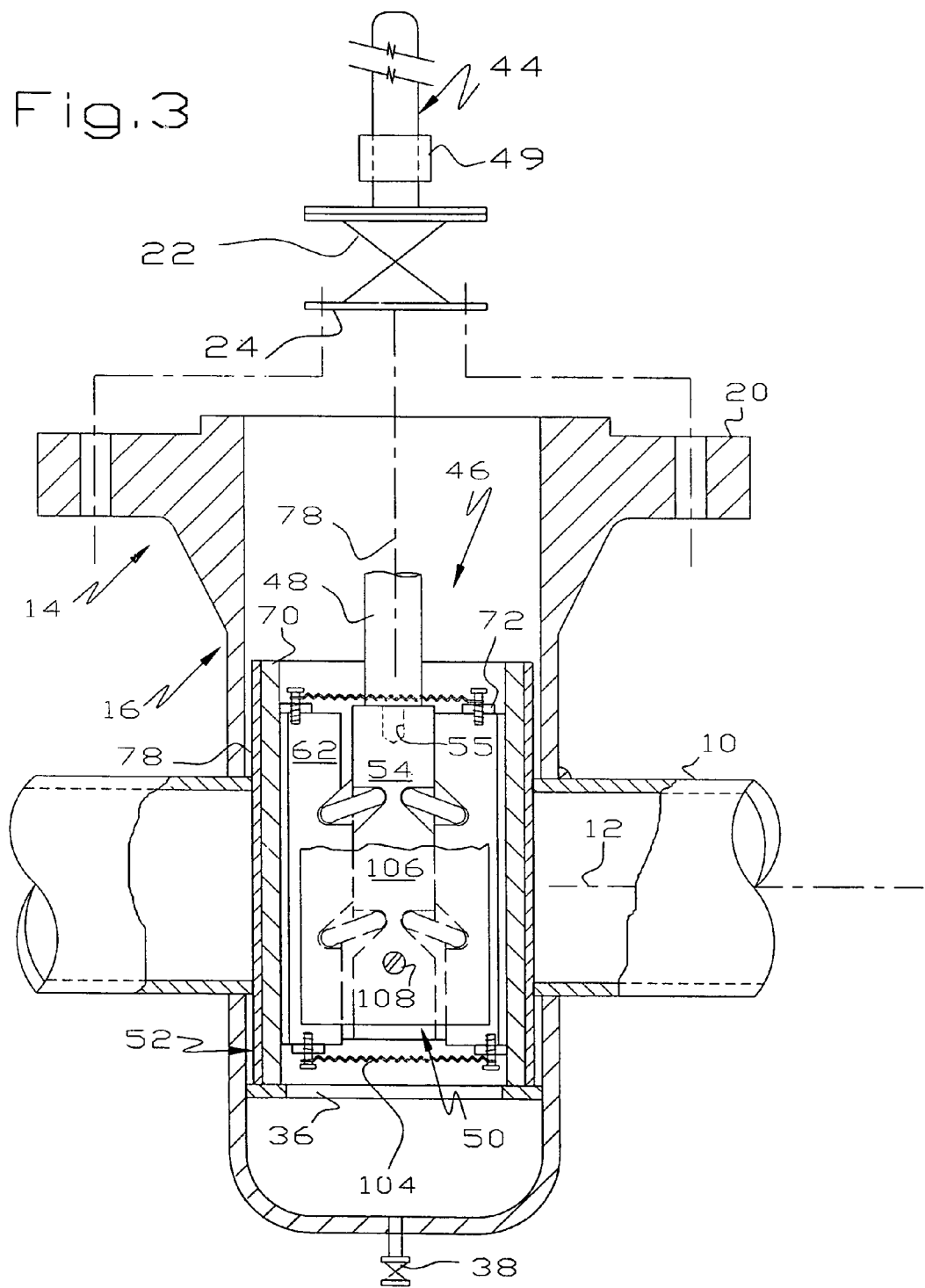

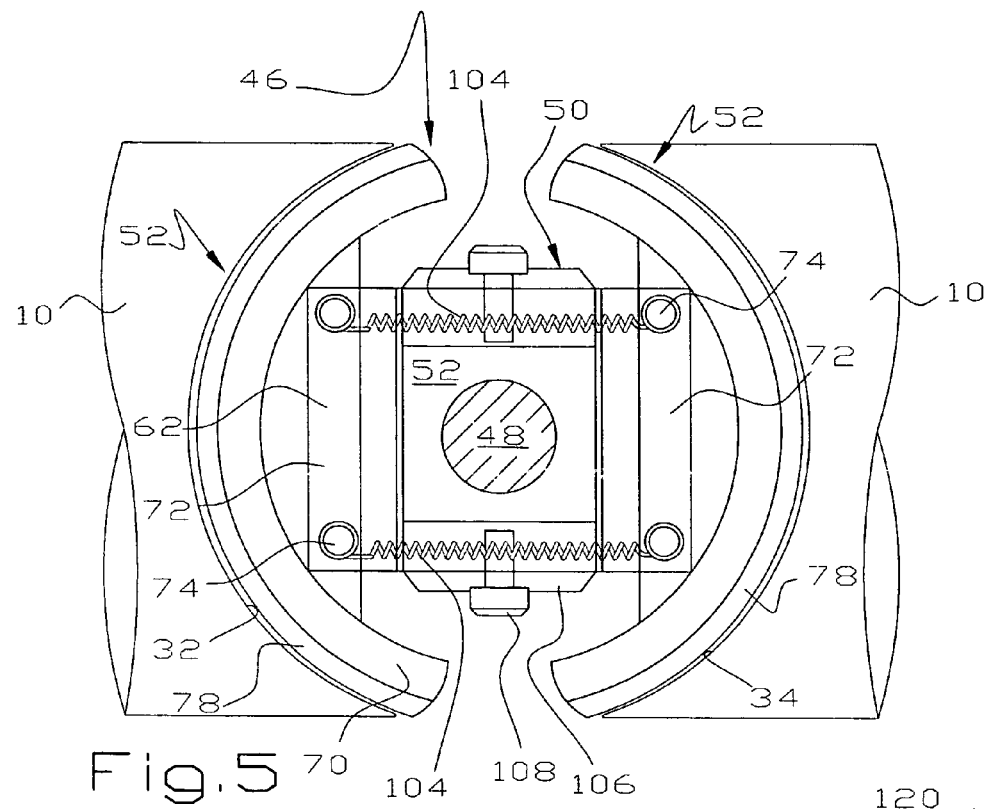
Fig. 5
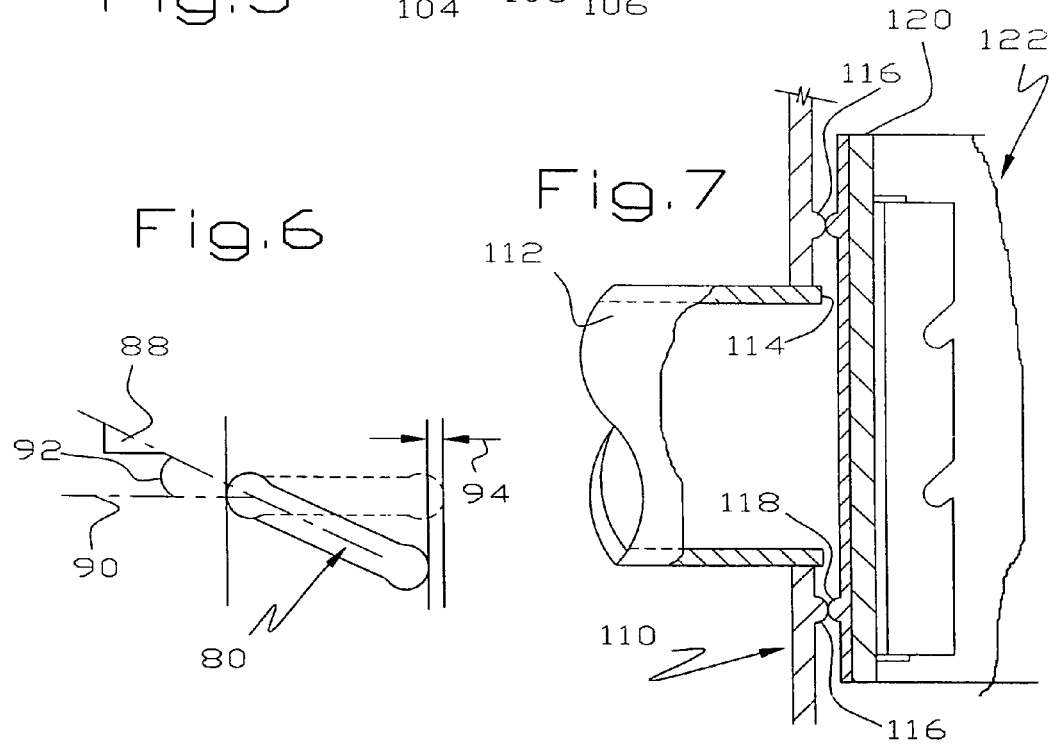
Fig. 6
Fig. 7

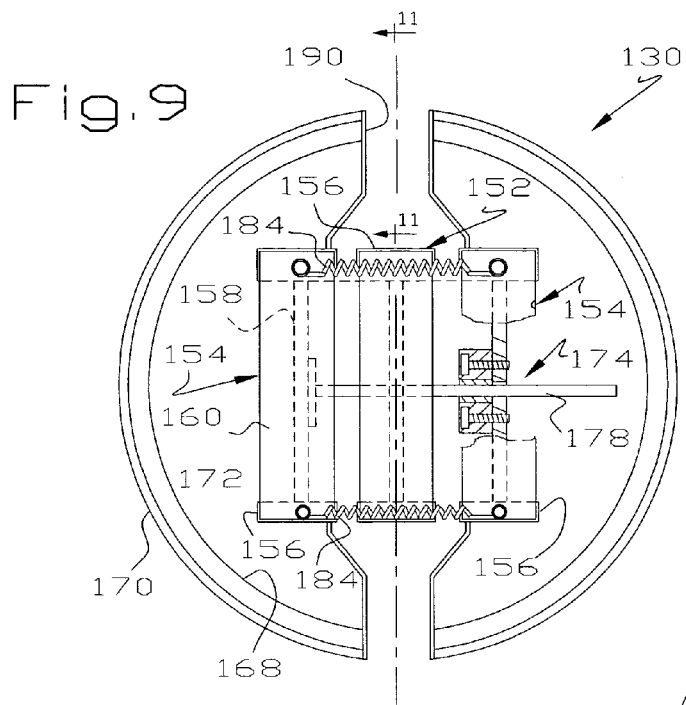
Fig. 9
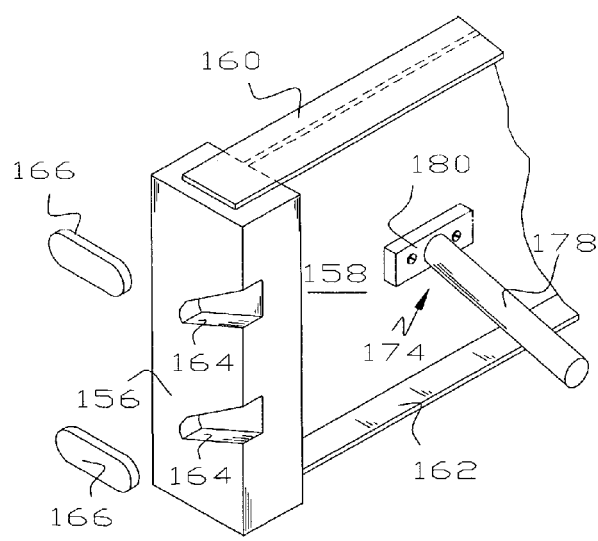
Fig. 10
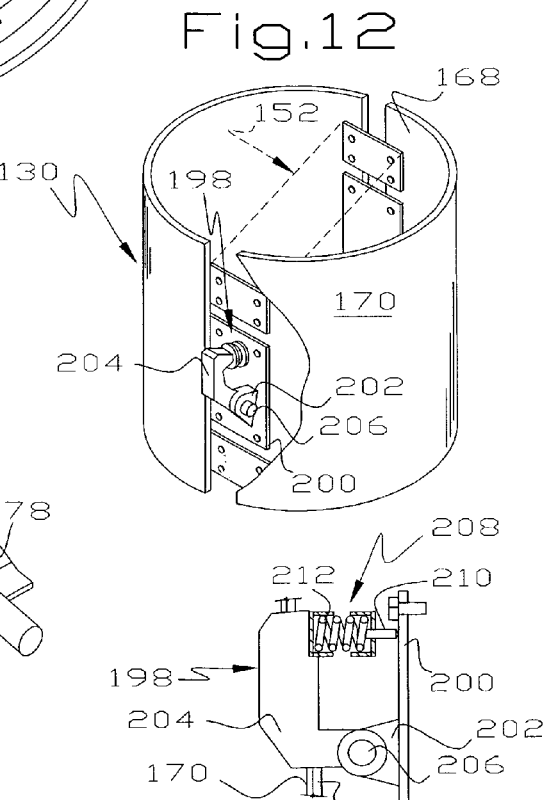
Fig. 12
Fig. 13

PIPELINE STOP

This invention relates to an apparatus for temporarily plugging a pipeline so modifications can be made to the pipeline.

BACKGROUND OF THE INVENTION

There are many occasions when flow in an operating pipeline has to be temporarily plugged, typically in order to repair some component that is partly or wholly inoperative. Similarly, there are occasions when a section of a pipeline under pressure, but not flowing, has to be isolated. Typical situations are when it is desired to close a valve in an operating pipeline and the valve will not close or there is a leaking or inoperative component that has to be replaced. As is well known in the art, many of these situations, such as in chemical plants, refineries and long distance pipelines, require that a bypass be made around the section to be plugged so flow through the pipeline is essentially continuous.

One conventional manner of temporarily plugging a pipeline is to weld a split housing onto the pipeline at a selected location, install a valve and packing element on the split housing and cut a small section of pipe, known as a coupon, out of the pipeline thereby leaving a pair of pipe ends exposed inside the housing. After the cutting device is removed, a pipeline stop is inserted through the valve and packing element and manipulated so it seals against the exposed pipe ends or to a seal inside the split housing thereby stopping flow though the pipeline. After the repairs are conducted on the pipeline, the pipeline stop is removed from the housing and the housing closed up thereby allowing fluids to resume flow through the pipeline.

To these ends, one type of conventional pipeline stop includes a pair of elements having semicylindrical sealing surfaces and a central element that is manipulated to expand the sealing elements. It is this type device to which this invention most nearly relates. Pipeline stops of several types are found in U.S. Pat. Nos. 587,107; 2,655,339; 2,740,606; 3,046,645; 3,155,369; 3,405,739; 3,543,802; 3,833,020; 3,863,667; 4,108,194 and 4,285,368. Another disclosure of interest relative to this invention is found in U.S. Pat. No. 4,405,113.

SUMMARY OF THE INVENTION

In this invention, the preliminary steps to plug a pipeline are the same as, or analogous to, that of the prior art in the sense that a location is selected based on the problem to be solved, a split housing is welded to the pipeline at the selected location, a valve is attached to the split housing and a cutting device incorporating a shell cutter is used to cut a section out of the pipeline, leaving ends of the pipeline exposed inside the split housing.

After the pipe section is removed from the split housing, the pipeline stop of this invention is inserted through the valve on top of the split housing. The pipeline stop includes a central section and a pair of lateral sections having faces shaped to seal against either the exposed ends of the pipeline or against a seal structure inside the split housing. The pipeline stop is advanced into the split housing so the faces of the lateral sections are aligned with what they are to seal against. The central section is then pushed downwardly either by a hydraulic cylinder, a gear train that advances a shaft or other suitable mechanism.

A series of links transmit this downward force from the central to the lateral sections so the links move from a first inclined position to a second, less inclined, position to block flow through the pipeline. Because the links lie only in a plane common to the pipeline, the only substantial force generated is along the pipeline axis, i.e. in a sealing direction. In other words, downward movement of the central element pushes one end of the links downwardly. Because of the angle and orientation of the links, downward movement of one end causes outward movement of the other end thereby pushing the sealing elements outwardly into a flow blocking position. The links include rounded ends and are elongate between the ends to provide relatively large movement of the sealing elements as contrasted to ball or roller type cam elements. Because the rounded ends of the links abut complementary surfaces on the stop sections, as contrasted to links which are mounted by pivot pins, large forces created by the downward force can be accommodated by the mechanism without warping of the stop.

Because downward movement of the central element causes outward movement of the sealing elements, upward movement of the central element removes the force on the cam links and allows the lateral sections to retract, as by the use of springs to pull the sealing elements inwardly. The pipeline stop is then removed from the housing.

It is an object of this invention to provide an improved pipeline stop for temporarily plugging a pipeline under pressure.

A further object of this invention is to provide a pipeline stop including an improved force applying mechanism to expand sealing elements against exposed pipe ends.

These and other objects and advantages of this invention will become more apparent as this description proceeds, reference being made to the accompanying drawings and appended claims.

BRIEF DESCRIPTION OF THE DRAWINGS

FIG. 2 is a view, similar to FIG. 1 showing a pipeline stop which has been inserted into a split housing surrounding the location where plugging is to occur;

FIG. 3 is a view similar to FIG. 2 showing the pipeline stop expanded into a position sealing the pipeline ends exposed inside the split housing, certain parts being broken away for clarity of illustration;

FIG. 4 is an enlarged view of the force transmitting links and the recesses in which they fit;

FIG. 5 is a top view of the pipeline stop of FIGS. 2 and 3 with the split housing removed for clarity of illustration;

FIG. 6 is a schematic view of the force transmitting links of the pipeline stop of this invention;

FIG. 7 is a view similar to FIG. 2 illustrating another sealing technique for temporarily plugging a pipeline;

FIG. 9 is a top view of another embodiment of a pipeline stop of this invention which has particular application for larger diameter pipelines;

FIG. 10 is an enlarged partial isometric view of one of the sections of the pipeline stop of FIG. 9;

FIG. 12 is a broken isometric view of the pipeline stop of FIGS. 9-10, certain parts being broken away for clarity of illustration, illustrating another embodiment of a centering device; and FIG. 13 is an enlarged side view of the centering device of FIG. 12.

DETAILED DESCRIPTION OF THE INVENTION

Figure 1:
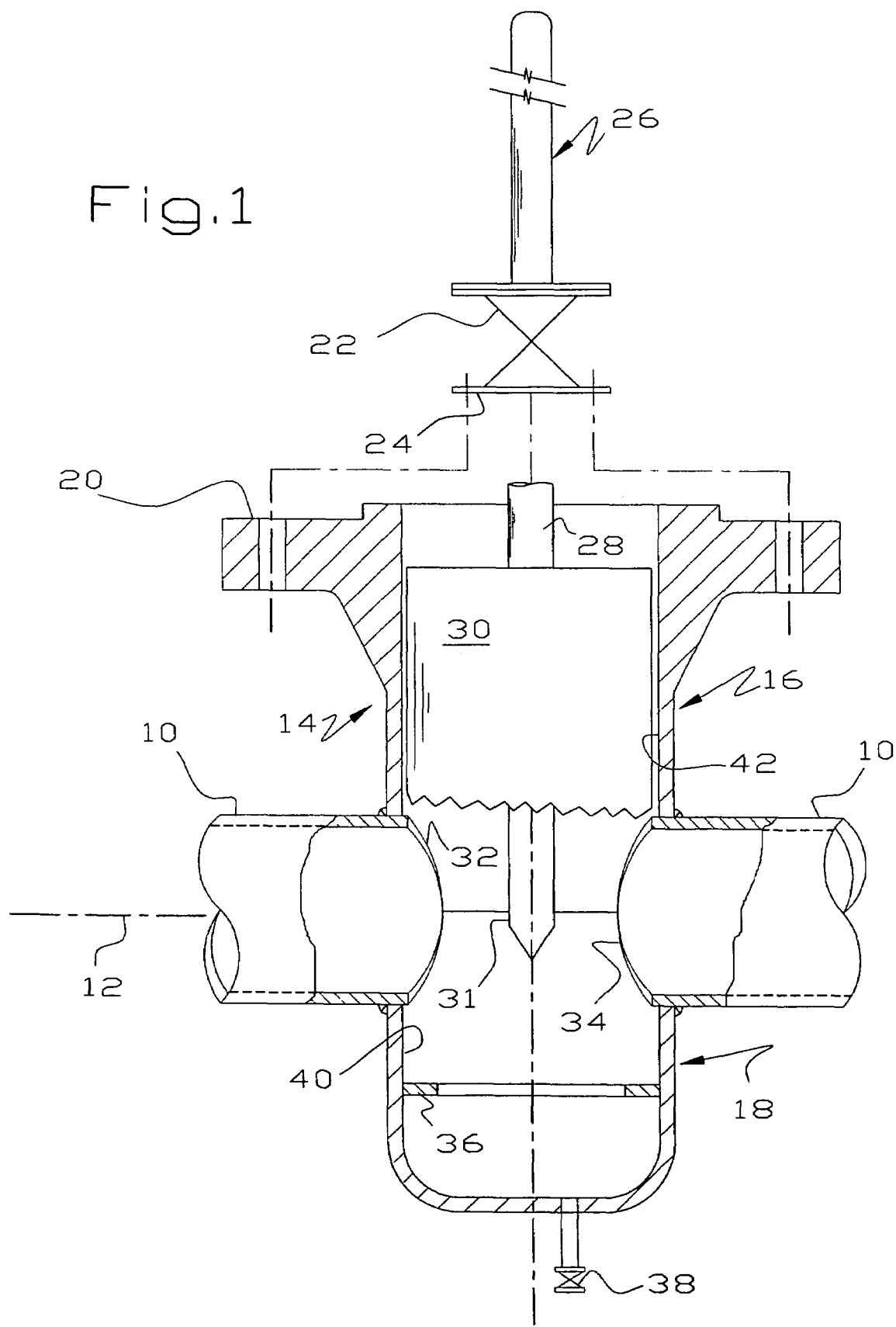
FIG. 1 is a cross-sectional view of a split housing and a pipeline from which a coupon has been cut.

Referring to FIGS. 1, there is illustrated a pipeline 10 having a longitudinal axis 12 to which has been welded a split housing 14 having an upper section 16 and a lower section 18. Although the axis 12 is typically horizontal, it will be apparent that many pipeline sections in chemical plants and refineries are vertical or inclined. As used herein, horizontal is defined as meaning parallel to the pipeline axis 12.

The upper section 16 of the split housing 14 includes a flange 20, screw threads or other suitable connection to which is attached a conventional valve 22 illustrated as having a flange 24 bolted to the flange 20. A powered cutting device 26 of a conventional type includes an output shaft 28 driving a shell cutter 30 having a pilot bit 31 and coupon retriever (not shown) which is used to cut and remove a section or coupon (not shown) out of the pipeline 10 leaving exposed pipe ends 32, 34 exposed inside the split housing 14.

The lower section 18 of the split housing 14 extends substantially below the pipeline 10 and provides an abutment ring 36 and a bleed off valve 38 for purposes more fully explained below. The upper and lower split housing sections 14, 16 provide passages 40, 42, larger than the diameter of the pipeline 10 so the shell cutter 30 is large enough to remove a complete section of the pipeline 10. The passages 40, 42 are perpendicular to the pipeline 10 and communicate between the exposed pipe ends 32, 34 to provide a compartment or chamber for receiving part of a pipeline stop. Those skilled in the art will recognize FIG. 1, as heretofore described, as being typical of at least one type of conventional pipeline plugging operation.

Referring to FIGS. 2-4, the shell cutter 30 has been withdrawn from the split housing 14 to a location above the valve 22. The valve 22 is closed and the powered cutting device 26 and cutter 30 are removed from the valve 22 and stowed in any suitable location. A different power unit 44 is bolted or otherwise secured to the valve 22 with the pipeline stop 46 disposed inside the split housing 14. The power unit 44 includes an output or rod 48 which is movable linearly up-and-down and, when operating the pipeline stop 46, is preferably incapable of transmitting torque. The power unit 44 may accordingly be a hydraulic cylinder, a gear train that advances a shaft, a threaded shaft which is advanced in connection with a coupling that will not transmit torque, or other suitable mechanism. An important feature of this invention is that any rotating components of the mechanism of this invention are located outside the split housing 14. This has an advantage in high temperature applications where metal growth from temperature expansion is capable of wreaking havoc on normal force applying devices, such as screw threads. By placing such components in the power unit 44 outside the split housing 14, a cooling jacket 49 may be placed around the device 44 to cool the device 44 and its rotating components, if any.

The pipeline stop 46 of this invention includes a central section 50, a pair of lateral sections 52, and a series of links 80 transmitting force between the sections 50, 52. The central section 50 includes a massive solid metal block or body 54, which is preferably rectangular, fixed to the rod 48 in any suitable manner, as by a threaded connection 55. The block 54 provides a pair of planar outer faces 56, generally perpendicular to the pipeline axis 12, through which opens a series of vertically spaced downwardly facing recesses 58 having curved reaction surfaces 60 of a shape more fully discussed below.

The lateral sections 52 include a massive solid metal block or body 62, which is preferably rectangular, having a generally planar inside face 64 abutting the outer faces 56 of the body 54 in a collapsed position of the lateral sections 52, as shown in FIG. 4. A series of vertically spaced upwardly facing recesses 66 provide curved reaction surfaces 68 of a shape more fully described below.

The outer side of the block 62 is connected to a curved outer face 70 shaped to seal against some component inside the split housing 14, such as the exposed pipe ends 32, 34 as shown best in FIG. 5. To this end, the block 54 is bolted or otherwise secured to struts 72 by threaded fasteners 74, the struts 72 and block 54 being welded or otherwise securely connected to the outer face 70 to provide a strong stable structure. As will be more fully apparent hereafter, the amount of throw or lateral movement of the lateral sections 52 is not large as may be seen in FIG. 6 and by a comparison of FIGS. 2 and 3. Thus, some pains are preferably taken to assure that the outer face 70 describes a cylinder perpendicular to the axis 76 of the rod 46, which is the shape of the outside of the coupon cut by the shell cutter 30.

The outer face 70 is preferably provided with a sealing layer 78, the nature of which depends on the material in the pipeline, the pressure in the pipeline and the temperature of the pipeline contents. Typically, the sealing layer 78 is softer than the pipe ends 32, 34. In water lines, the layer 78 is preferably rubber, neoprene, VITON or the like. In high temperature steam lines, the layer 78 is preferably bronze, lead or the like to provide a metal-to-metal seal or GARLOCK gasket material. In typical natural gas lines, the layer 78 is typically VITON, rubber, neoprene, GARLOCK gasket material or the like.

Downward movement of the central section 50 is translated into outward movement of the lateral sections 52 by a plurality of elongate links 80 received in the recesses 58, 66. The links 80 are preferably identical and include rounded ends 82, 84, which are preferably semicircular, and an elongate center 86. As shown best in solid lines in FIG. 6, the links 80 are positioned in a first inclined position when the pipeline stop 46 is collapsed. When the central section 50 is moved downwardly, the lateral sections 52 are prevented from moving downwardly because they bottom out on the abutment ring 36. As the lateral sections 52 stop moving downwardly, the only direction they can move is laterally toward the pipeline ends 32, 34. As the central section 50 continues to move downwardly, the links 80 assume a more nearly horizontal position shown in dashed lines in FIG. 6. This pushes the lateral sections 52 outwardly into an expanded position so the layer 78 seals against the pipeline ends 32, 34. An important feature of this invention is that the links 80 are located in a plane common to the pipeline axis 12 so the only forces produced are outward and parallel to the pipeline axis 12. This produces a maximum sealing force. In addition, the links 80 are free of pivot pins so that the loads are applied to the link ends 82 and not to a smaller pivot pin.

An important feature of this invention is the amount of force generated by the links 80 against the lateral sections 52. As the angle 88 becomes more horizontal, the lateral force applied to the lateral sections 52 increases. In the design of the pipeline stop 46, it is preferred that the axis 90 not reach parallel to the pipeline axis 12. Instead, the axis 90 should approach at some minimum angle to the pipeline axis 12, e.g.

5-15° and the angle 92 between the two positions of the links 80 be in the range of 5-20°, preferably about 10°. FIG. 6 also shows a limitation of the pipeline stop 46 of this invention. The amount of expanding movement of the lateral sections 52 is limited by the horizontal difference between the end of the links 80 on one side of the pipeline stop 46 is suggested by the dimension 94, meaning that the total displacement is twice the dimension 94. In other words, the force transmitting links 80 produce a significant closing force on the lateral sections 52 at a design cost of a rather small displacement, meaning that the coupon cut from the pipeline 10 is preferably reasonably accurate. In a prototype of this invention designed to temporarily plug a 4" O.D. steam line operating at 550° F. and 600 psig, the total amount of movement of the lateral sections 52 was on the order of about one half inch. This device was used to completely plug this steam pipeline so a leaking flange could be repaired despite the fact that the coupon cut from the pipeline was not completely symmetrical as was evident because one outside edge of the pipe was partially cut away.

As shown best in FIG. 4, the downwardly facing recesses 58 provide a lower flat side 96 merging with the face 56 and with the reaction surface 60. The recesses 58 also provide an upper flat surface 98 merging between the reaction surface 60 and the face 56. Similarly, the recesses 66 provide upper and lower flat sides 100, 102 merging between the reaction surface 68 and the face 64. It will accordingly be seen that the flat sides 96, 98, 100, 102 constrain movement of the links 80 in the range of the angle 92.

When the pipeline repair job is complete and it is desired to remove the pipeline stop 46, the force applying device 44 is manipulated to pull up on the rod 48. This moves the central section 50 upward and allows the lateral sections 52 to retract. To this end, springs 104 are provided between the heads of the threaded fasteners 74 as shown in FIGS. 2-4.

Unless constrained against movement toward the viewer in FIGS. 2-3, it is possible for the links 80 to move out of the recesses 58, 66. To avoid this, a plate or shroud 106 is attached by a threaded fastener 108 on opposite sides of the central section 50 as shown best in FIG. 5.

Operation of the pipeline stop 46 of this invention should now be apparent. After the split housing 14 is welded to the pipeline 12, the valve 22 is attached to the flange 20 and the cutter unit 26 is attached to the valve 22 and a coupon is cut from the pipeline 10 leaving the exposed ends 32, 34. After closing the valve 22, the cutter unit 26 and coupon are removed. A power unit 44 is attached to the flange 20 with the pipeline stop 46 of this invention on the end of a non-rotatable force applying rod 48. The pipeline stop 46 is lowered into the cavity between the exposed pipeline ends 32, 34 with the curved sealing faces 78 aligned with the pipeline ends 32, 34. The power unit 44 is then actuated to push downwardly on the rod 48. This pushes the pipeline stop 46 downwardly until the lateral sections 52 bottom out on the abutment ring 36. Downward movement of the output rod 48 continues, and may be measured, whereupon the lateral sections 52 begin to expand, or move laterally, toward the pipeline ends 32, 34 because the links 80 are pushed from an more inclined position toward a less inclined position, as shown in FIG. 6 into sealing engagement with the pipeline ends 32, 34. After the pipeline ends 32, 34 are sealed by the stop 46, the effectiveness of the seal can be checked by opening the valve 38 which would allow any pipeline contents to escape if the seal were not effective. After the pipeline repair job is complete, the pipeline stop 46 is removed and the valve 22 is closed.

In the embodiment of FIGS. 1-6, the sealing faces 78 provided by the lateral sections 52 are convex and part of a cylinder because this is the shape of the inside of the pipe ends 32, 34 after the coupon is removed. It is within the scope of this invention to make the split housing 14 with a structure that the pipeline stop 46 seals against. Referring to FIG. 7, a split housing 110 has been welded to a pipeline 112 to provide a pipeline end 114. The split housing 110 provides a sealing structure 116 which is abutted by a similar seal 118 on the outer sealing face 120 of the lateral section 122. The lateral sections 122 are moved inwardly and outwardly as shown in FIGS. 1-6.

Referring to FIGS. 8-11, there is illustrated another embodiment 130 of a pipeline stop of this invention which is particularly suited for use in a large diameter pipeline 132. A split housing 134 includes an upper section 136 and a lower section 138 welded to the pipeline 132 along a pair of circumferential welds 140 and preferably an axial weld 142. A series of gussets 144, 146 are welded or otherwise secured to the housing 134 and to the pipeline 132 providing additional strength to the pipeline ends 148, 150, particularly after a coupon (not shown) has been cut so there is a substantial gap between the pipeline ends 148, 150 inside the split housing 134 in a manner comparable to the showing of FIG. 1.

The organization of the pipeline stop 130 is the same as that of the stop 46 in the sense there is a central section 152, a pair of lateral sections 154 and a linkage arrangement 156 for translating downward movement of the central section 152 into horizontal movement of the sections 154. Because the pipeline stop 130 has its major utility in larger diameter pipelines, one or more modifications are desirable.

In order to reduce the weight of the stop 130, the central section 152 and the lateral sections 154 are not solid metal blocks but are instead of H or I beam construction incorporating a pair of solid end pieces 156, a central web 158, a top plate 160 and a bottom plate 162. As will be evident from FIG. 10, the end pieces 156 provide recesses 164 receiving links 166 so downward movement of the central section 152 causes lateral or horizontal movement of the sections 154. The lateral sections 154 are each connected to a semicylindrical outer face 168 having a sealing layer 170 by one or more plates 172. It will accordingly be seen that lateral or horizontal movement of the sections 154 causes the sealing layer 170 to move toward and away from the pipeline ends exposed inside the split housing 134.

Another modification that is desirable for large size pipeline stops of this invention is a guide 174 which constrains movement of the sections 152, 154 horizontally, i.e. parallel to the pipeline axis 176, and prevents relative movement of the sections 152, 154 in other directions. The guide 174 may be of any suitable configuration and is illustrated as comprising a rod 178 secured to a fixture 180 on one of the sections 152, 154 and extending through one or more bearings 182 on other sections. In order to prevent relative rotational movement between the sections 150, 152, 154, two or more rods 178 may be provided. The provision of the guide 174 assures that movement of the sections 154 toward and away from the central section 152 is in a predictable direction without relying on the springs 184.

Figure 11:
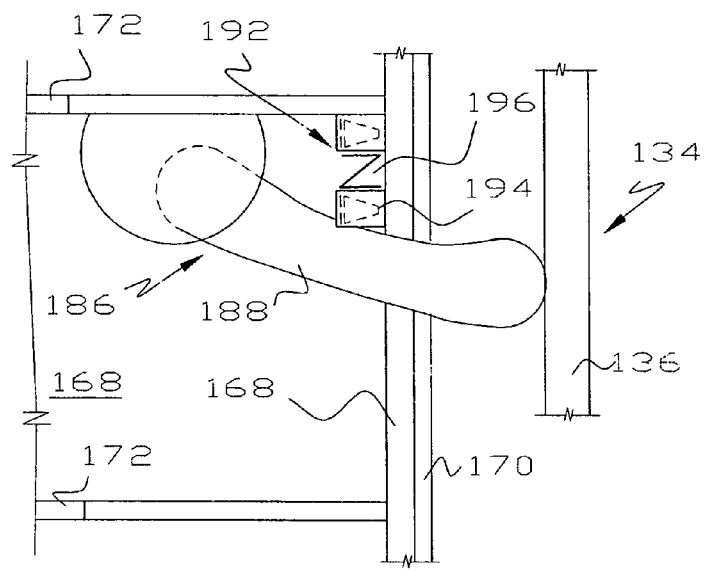
FIG. 11 is an enlarged partial cross-sectional of the pipeline stop of FIGS. 9-10, taken substantially along line 11-11 of FIG. 9, as viewed in the direction indicated by the arrows, illustrating one embodiment of a centering device.
Figure 8:
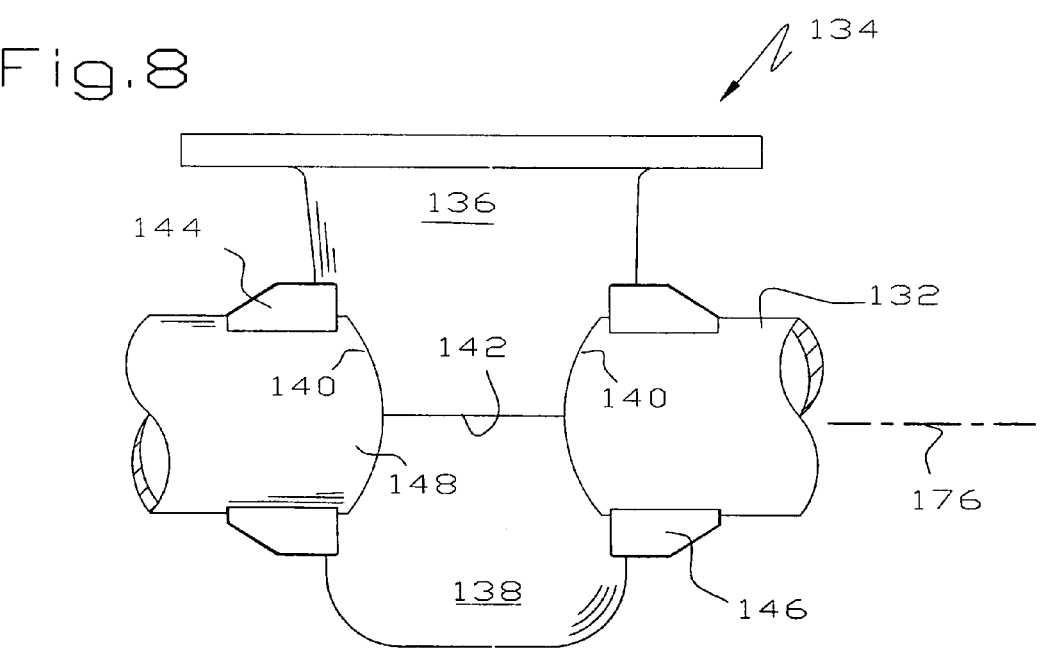
FIG. 8 is a side view of a split housing welded to a pipeline through which flow will be stopped by another embodiment of this invention.

Another modification that is desirable for large size pipeline stops of this invention is shown best in FIG. 11. Because the pipeline 132 is of considerable size and there is considerable potential lateral movement of the sections 154, there is a tendency for the pipeline stop 130 to become off center inside the split housing 134. To obviate this tendency, a centering mechanism 186 is provided comprising a plurality of centering pins or levers 188 extending through the gap 190 (FIG. 9) between the semicylindrical outer faces 168 to engage the inside of the split housing 134. The levers 188 are biased outwardly by a spring assembly 192 of any suitable type, e.g. a pair of cups 194 receiving a spring 196. Because there is at least one, and preferably two or more, centering levers 188 on each side of the stop 130, it will be seen that the stop 130 is forced away from each side of the housing 134 toward the center thereof.

Another modification that is desirable for large size pipeline stops of this invention is shown best in FIGS. 12-13. Often, the pipeline stop 130 is inserted vertically into the split housing 134. If a centering device is needed, the embodiment of FIG. 11 is quite adequate. Occasionally, the configuration of the pipeline 132 is such that the split housing 134 is set up horizontally or on an incline so the pipeline stop 130 is inserted horizontally or on an incline. In this event, the pipeline stop 132 is inserted into the split flange 134 on the end of a boring bar or pipe section. Because the pipeline stop 130 is of considerable weight, relatively robust measures are taken to center the stop 130 and minimize any tendency of the stop 130 to sag and thereby snag the pipeline ends or other elements inside the split housing 134.

To this end, a centering lug assembly 198 is provided as shown in FIGS. 12-13. The lug assembly 198 comprises a plate or bracket 200 secured to one or both ends of the central section 152 providing an eye 202. An arm 204 is pivoted to the eye 204 by a pin 206 and is of sufficient size to extend somewhat beyond the sealing layer 170 to engage the inside of split housing 134 and/or the cut off ends of the pipeline 132. A spring assembly 208 is mounted on the end of the arm 204 and includes a feeler pin assembly 210 biased against the plate 200 by a spring 212. When the pipeline stop 130 is inserted horizontally, for example, into the split housing 134, a centering lug assembly 198 on the bottom of the stop 130 supports and centers the stop 130 and prevents the sealing layer 170 from snagging the inside of the split housing 134. It will be seen that the ends of the arm 204 are beveled for this purpose.

Operation of the pipeline stop 130 is essentially the same as operation of the stop 46 even though the stop 130 is larger and thus heavier.

Although this invention has been disclosed and described in its preferred forms with a certain degree of particularity, it is understood that the present disclosure of the preferred forms is only by way of example and that numerous changes in the types of fatty acids and types of abrasives as well as the percentages thereof may be resorted to without departing from the spirit and scope of the invention as hereinafter claimed.

I claim:

1. A mechanism for temporarily blocking flow in a pipeline having a flow axis, comprising
    a split housing for welding around the pipeline and having a device for positioning a valve on top of the split housing whereby a cutter and then a pipeline stop may be inserted into the split housing;
    an actuator for mounting on the valve to operate a pipeline stop providing a linearly movable output incapable of transmitting torque; and
    a pipeline stop including
        a central section cooperating with the output and having a series of downwardly facing recesses;
        a pair of lateral sections each having an outer face for sealing against flow through ends of the pipeline extending into the split housing and an inner face having a series of upwardly facing recesses; and
        a series of inclined links having ends movably abutting the upwardly and downwardly facing recesses and capable of angular movement relative thereto, the links being downwardly inclined from the central section toward the lateral sections so that downward movement of the output causes downward movement of the central section toward a lower position thereby moving the links from a first position defining a first angle to a longitudinal axis of the pipeline to a second position more nearly aligned with the pipeline axis and causing outward movement of the lateral sections for stopping flow through the pipeline and upward movement of the central section away from the lower position allows inward movement of the lateral sections so the pipeline stop can be removed from the pipeline whereby moving the links toward the second position creates an increasingly large force sealing the outer face against the pipeline ends.

2. The mechanism of claim 1 wherein the downwardly facing recesses are concavely curved and the links have convexly curved upper ends in force transmitting relation with the downwardly facing recesses of the central section and the upwardly facing recesses are concavely curved and the links have convexly curved lower ends in force transmitting relation with the upwardly facing recesses.

3. The mechanism of claim 2 wherein the downwardly facing recesses, the upwardly facing recesses, the upper link ends and the lower link ends include reaction surfaces of generally semicircular shape.

4. The mechanism of claim 1 wherein the split housing provides an abutment inside the passage on a side opposite from the valve positioning device, the abutment abutting the lateral sections and preventing downward movement of the lateral sections during downward movement of the central section.

5. The mechanism of claim 1 wherein the face of the lateral sections each comprise a curved outwardly facing convex element comprising part of a cylinder for sealing against pipe ends cut with a circular cutter and thereby exposed inside the housing thereby stopping flow through the pipeline.

6. The mechanism of claim 1 wherein the split housing includes a seal therein and the lateral sections abut the split housing seal thereby stopping flow through the pipeline.

7. The mechanism of claim 1 wherein the ends of the links are free of pivot pins.

8. The mechanism of claim 1 wherein the lateral sections each comprise a solid metal block and the outer face comprises a generally semicylindrical member and further comprising a strut securing the block to the semicylindrical member.

9. The mechanism of claim 8 wherein each lateral section comprises a pair of solid blocks connected by a web and the strut comprises a plate having a semicircular edge abutting the semicylindrical member.

10. The mechanism of claim 1 wherein the links reside in a common plane and generate forces on the lateral sections that are wholly parallel to the pipeline.

11. The mechanism of claim 1 further comprising a plate overlapping the central and lateral sections preventing movement of the links out of the recesses.

12. The mechanism of claim 1 further comprising a guide constraining movement of the lateral sections parallel to the longitudinal axis of the pipeline.

13. The mechanism of claim 1 further comprising a device for centering the pipeline stop inside the split housing.

14. The mechanism of claim 13 wherein the outer faces of the lateral sections provide a gap generally perpendicular to a longitudinal axis of the pipeline and the centering device comprises a member extending through the gap for engaging the split housing and biasing the pipeline stop toward a centered position inside the split housing.

15. A pipeline stop for temporarily blocking flow in a pipeline cut with a circular cutter, comprising a central section cooperating with an output of an actuator, and having a series of inclined recesses;

a lateral section on each side of the central section, each lateral section having an outer face defining part of a cylinder to seal against flow through ends of the pipeline extending into a split housing on the pipeline and an inner face having a series of inclined recesses; and a series of inclined links having ends movably abutting the inclined recesses and capable of angular movement relative thereto, the links being inclined from the central section toward the lateral sections so that movement of the output toward a longitudinal axis of the pipeline causes movement of the central section toward the pipeline axis thereby moving the links from a first position defining a first angle to the pipeline axis to a second position more nearly aligned with the pipeline axis and causing outward movement of the lateral sections so the lateral sections abut the pipeline ends thereby stopping flow through the pipeline and subsequent opposite movement of the central section away from the pipeline axis allows inward movement of the lateral sections so the pipeline stop can be removed from the pipeline, the link ends being wholly constrained by the recesses and being free of pivot pins whereby moving the links toward the second position creates an increasinqly large force sealing the outer face against the pipeline ends.

16. The pipeline stop of claim 15 wherein the lateral sections each comprise a solid metal block and the outer face comprises a generally semicylindrical member, the block and member being welded together.

17. The pipeline stop of claim 16 wherein each lateral sections comprise a pair of solid blocks connected by a web and the strut comprises a plate having a semicircular edge abutting the semicylindrical member.

18. The pipeline stop of claim 15 wherein the links reside in a common plane and generate forces on the lateral sections that are wholly parallel to the pipeline.

19. The pipeline stop of claim 15 further comprising a plate overlapping the central and lateral sections preventing movement of the links out of the recesses.

20. The pipeline stop of claim 15 further comprising a guide constraining movement of the lateral sections parallel to the longitudinal axis of the pipeline.

21. The pipeline stop of claim 15 further comprising a device for centering the pipeline stop inside the split housing.

22. The pipeline stop of claim 21 wherein the outer faces of the lateral sections provide a gap generally perpendicular to the longitudinal axis of the pipeline and the centering device comprises a member extending through the gap for engaging the split housing and biasing the pipeline stop toward a centered position inside the split housing.

* * * * *